United States Patent
Taylor et al.

(10) Patent No.: US 6,568,838 B2
(45) Date of Patent: May 27, 2003

(54) CONVERTIBLE ORIENTATION BICYCLE LAMP

(75) Inventors: Harry B. Taylor, Lafayette, CO (US); Paul Klinger, Westminster, CO (US)

(73) Assignee: Pacific Cycle, LLC, Vernon Hills, IL (US)

( * ) Notice: Subject to any disclaimer, the term of this patent is extended or adjusted under 35 U.S.C. 154(b) by 0 days.

(21) Appl. No.: 09/819,533

(22) Filed: Mar. 27, 2001

(65) Prior Publication Data

US 2001/0053081 A1 Dec. 20, 2001

Related U.S. Application Data

(63) Continuation of application No. 09/602,898, filed on Jun. 23, 2000, now Pat. No. 6,227,688, which is a continuation of application No. 09/351,274, filed on Jul. 12, 1999, now Pat. No. 6,264,351, which is a continuation of application No. 08/823,140, filed on Mar. 25, 1997, now Pat. No. 5,921,669.

(51) Int. Cl.$^7$ .................................................. B62J 6/02
(52) U.S. Cl. ................... 362/474; 362/475; 362/197; 362/198; 362/250; 362/396; 362/249
(58) Field of Search .......................... 362/475, 197, 362/198, 199, 250, 396, 473, 474, 238, 239, 184, 249

(56) References Cited

U.S. PATENT DOCUMENTS

| | | |
|---|---|---|
| 1,592,915 A | 7/1926 | Webb |
| 2,010,058 A | 8/1935 | Carlson |
| 2,287,874 A | 6/1942 | Gibbons et al. |
| 3,906,443 A | 9/1975 | Musselman |
| 4,170,337 A | 10/1979 | Davis |
| 4,204,191 A | 5/1980 | Daniels |
| 4,477,865 A * | 10/1984 | Tsuyama ............... 362/396 |
| 4,528,622 A | 7/1985 | Bacevius |

(List continued on next page.)

FOREIGN PATENT DOCUMENTS

GB 654448 6/1951

OTHER PUBLICATIONS

Catalog from Cat Eye Service and Research Center, Boulder, CO; 1997; pp. 1,3,4 and 5.
Products Catalog from VistaLite, a division of Bell Sports, Inc., Rantoul, IL, 1995–1996; pp. 1,6,7,8 and 9.
Brochure from Technical Lighting Systems, San Diego, CA, for NiteRider ™Technical Lighting Systems; available as early as Mar. 25, 1997.
Brochure from Turbocat Lightning Systems, Thousand Oaks, CA; 1994.
Brochure from SSB Design Inc.; Irvine CA, for Cygo–Lite; available as early as Mar. 25, 1997.
Brochure from JET Designs, Santa Cruz, CA, for Jet Lites; Sep. 10, 1996.
Brochure from MARWIUSA, Olney, IL for nightpro ™; available as early as Mar. 25, 1997.
Brochure from Nightsun Performance Lighting, Pasadena, CA, for Nightsun Max; available as early as Mar. 25, 1997.

*Primary Examiner*—Sandra O'Shea
*Assistant Examiner*—Anabel Ton
(74) *Attorney, Agent, or Firm*—Holland & Hart

(57) ABSTRACT

The rotatable and mountable light assembly of the present invention includes a base member, the base member pivotally connected to a clamping member, the clamping member comprising a means to removably secure the base member to a bar; a lamp holding member releasably secured to the base member, the lamp holding member comprising a lamp receiving space, the lamp receiving space being of sufficient space to receive at least one individual lamp. The lamp holding member is capable of altering its orientation with regard to the base member such that the orientation of the lamp holding member vis-à-vis the clamping member may be altered; the single lamp residing in a portion of the receiving space, the lamp comprising a tens and a means to illuminate; and a means to provide power to the lamp.

20 Claims, 7 Drawing Sheets

U.S. PATENT DOCUMENTS

| | | | |
|---|---|---|---|
| 4,597,031 A | | 6/1986 | Tsuyama |
| 4,697,725 A | | 10/1987 | Miree |
| 5,181,774 A | | 1/1993 | Lane |
| 5,355,746 A | | 10/1994 | Lin |
| 5,436,810 A | * | 7/1995 | Sutherland et al. ............ 362/72 |
| 5,580,151 A | | 12/1996 | Chen |
| 5,580,152 A | | 12/1996 | Carter |
| 5,617,303 A | | 4/1997 | Izzo, Sr. |
| 5,641,220 A | | 6/1997 | Sutherland et al. |
| 5,690,416 A | | 11/1997 | Van Gennep |
| 5,769,526 A | * | 6/1998 | Shaffer ........................ 362/80 |
| 5,795,050 A | | 8/1998 | Carter |
| 5,823,657 A | * | 10/1998 | Price et al. .................. 362/191 |
| 5,823,658 A | | 10/1998 | Doddy |
| 5,833,359 A | | 11/1998 | Hollenbach |
| 5,872,510 A | | 2/1999 | O'Shaughnessy |
| 5,921,669 A | | 7/1999 | Taylor et al. |
| 5,933,076 A | | 8/1999 | Babb |
| 6,012,827 A | | 1/2000 | Caplan et al. |
| 6,082,872 A | | 7/2000 | Ting |
| 6,086,228 A | * | 7/2000 | McGowan et al. ......... 362/396 |
| 6,109,770 A | | 8/2000 | Choimet et al. |
| 6,135,625 A | | 10/2000 | Kodaira et al. |
| 6,264,351 B1 | * | 7/2001 | Taylor et al. ................ 362/475 |

* cited by examiner

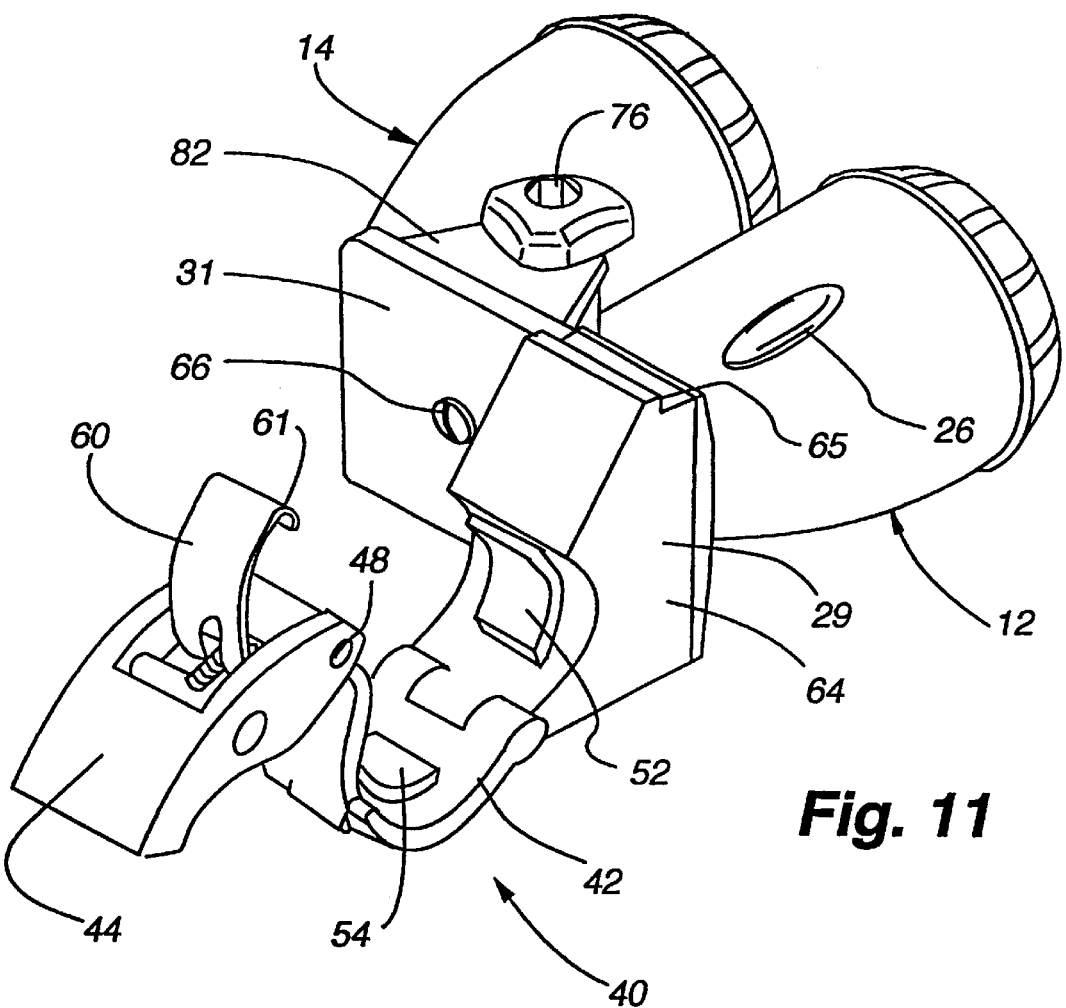
Fig. 11
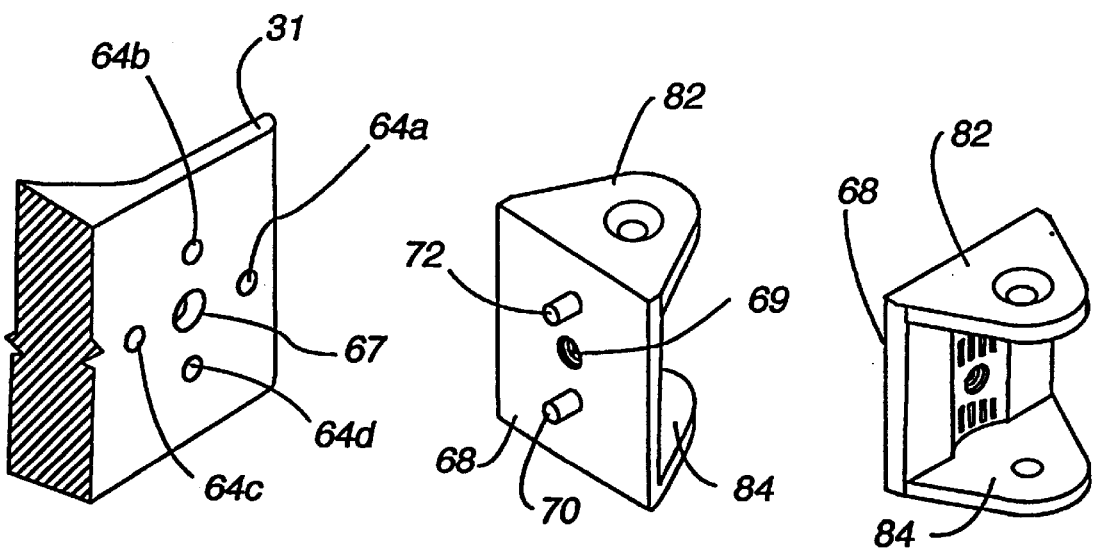
Fig. 12  Fig. 13  Fig. 14

CONVERTIBLE ORIENTATION BICYCLE LAMP

This is a continuation of application Ser. No. 09/602,898, filed on Jun. 23, 2000, issued as U.S. Pat. No. 6,227,688, which is a continuation of application Ser. No. 09/351,274, filed on Jul. 12, 1999, issued as U.S. Pat. No. 6,264,351, which is a continuation of application Ser. No. 08/823,140, filed on Mar. 25, 1997, issued as U.S. Pat. No. 5,921,669.

FIELD OF THE INVENTION

The present invention generally relates to a light to be utilized in conjunction with a bicycle or other non-motorized vehicle. The light is mainly designed to be secured to the handlebars of a bicycle, thereby providing light for the cyclist.

BACKGROUND OF THE INVENTION

Lights secured to bicycles have long been utilized to aid the cyclist in biking at times of the day when there is not enough light to safely ride a bicycle. Typically, the lights have been mounted on the bicycle's handlebars, or the front stem of the bicycle, or even the rider. Typically these lights would be a single beam light, which is mounted to the bicycle. Examples of these types of lights are shown in U.S. Pat. Nos. 4,477,865, 5,436,810, and 4,697,725.

One of the shortcomings of these prior art lights is that oftentimes the field of vision is limited due to the small size of the beam of light. If the cyclist is riding at night, particularly at a higher speed, it is advantageous to have more light generated than a typical single lamp light.

Many of the prior art lights are also cumbersome to take on and off a bicycle. This is oftentimes necessary if the user has two or more bicycles, and does not want to purchase a separate light for each bicycle.

A need has developed over the past years for a light having more flexibility in its use and a broader beam of light than those shown in the prior art. The biking industry has undergone a tremendous change over the past years with mountain bikes becoming very prominent. Mountain bikes are oftentimes used on a different type of terrain than the traditional road bikes. Road bikes traditionally have been used on sidewalks or paved roads. Mountain bikes, although capable of being used on sidewalks and roads, are intended for use on off-road trails, which typically are not paved and oftentimes are fairly narrow and have many sharp turns and hidden obstacles. The light requirements for a road bike which may be traveling fairly fast on a flat surface are different than on a road bike which might not be traveling at the same rate of speed but that will be traveling on a trail where there are bumps, rocks and holes.

Oftentimes, a mountain bike will be used both on the road and off the road. Thus, a single bike will be used in different applications, thereby necessitating a different light requirement for use in the twilight and evening hours.

It is also desirable to have a bike light which can be initially purchased with a single light, and then if the user thereafter desires to add a light, a single lamp can be purchased and added to the previously-purchased lamp system.

Another problem which exists with single bicycle lamp structures is that if for some reason the bulb of a lamp goes out, the user typically must navigate in the dark. Thus, there is a need for a backup lamp to provide light in the event that the first lamp burns out.

There is a need for a single bicycle lamp which can be adapted for both on road and on trail applications.

There is a need for a bicycle lamp which may be easily removed from one bike and put on another bike.

There is a need for a bicycle lamp which may be easily mounted and removed from the bicycle.

These and other advantages are described in more detail below.

SUMMARY OF THE INVENTION

The present invention is directed to a bicycle lamp which is multi-functional. The orientation of the bicycle lamp may be rotated such that in applications wherein it is necessary to have broad horizontal light coverage, the lamp may accommodate such a requirement. In other applications, wherein a long, vertical beam of light is required, the lamp of the present invention may achieve this requirement. The bicycle lamp may be quickly mounted and quickly removed from the handlebars. The orientation of the bicycle lamp may also be converted in a simple and easy fashion. Finally, it is possible to utilize either one or two lamps as desired. If one lamp is used, the lamp is centered over the approximate midpoint of the handlebars, and can be upgraded to a two lamp application.

In more detail, the mountable light assembly of the present invention includes a base member, the base member pivotally connected to a clamping member, the clamping member comprising a means to removably secure the base member to a bar; a lamp holding member releasably secured to the base member, the lamp holding member comprising a lamp receiving space, the lamp receiving space being of sufficient space to receive at least one individual lamp. The lamp holding member is capable of altering its orientation with regard to the base member such that the orientation of the lamp holding member vis-à-vis the clamping member may be altered; the single lamp residing in a portion of the receiving space, the lamp comprising a lens and a means to illuminate; and a means to provide power to the lamp.

BRIEF DESCRIPTION OF THE DRAWINGS

FIG. 11 is a perspective view of the bicycle lamp of the present invention shown in its horizontal mode with the handlebar clamp in the open position.

FIG. 12 is element 31 as shown in FIG. 10.

FIG. 13 is element 82 as shown in FIG. 11.

FIG. 14 is element 82 as shown in FIG. 11.

DESCRIPTION OF THE PREFERRED EMBODIMENT

The light assembly of the present invention, as shown in FIGS. 1–18, includes a lamp assembly adjustably attached to a clamp assembly. The clamp assembly can be releasably secured to a cylindrical body, such as a tube. The clamp assembly is adjustable to enable the clamp assembly to receive tubes of varying diameters and shapes. The lamp assembly is attached to an extending portion of the clamp assembly and can be easily rotated about the point of connection with the clamp assembly. The adjustment of the lamp assembly with respect to the clamp assembly as well as the ability of the light to be used with only one lamp allows the illumination provided by the lamp assembly to be modified to satisfy the requirement of the user.

Figure 1:
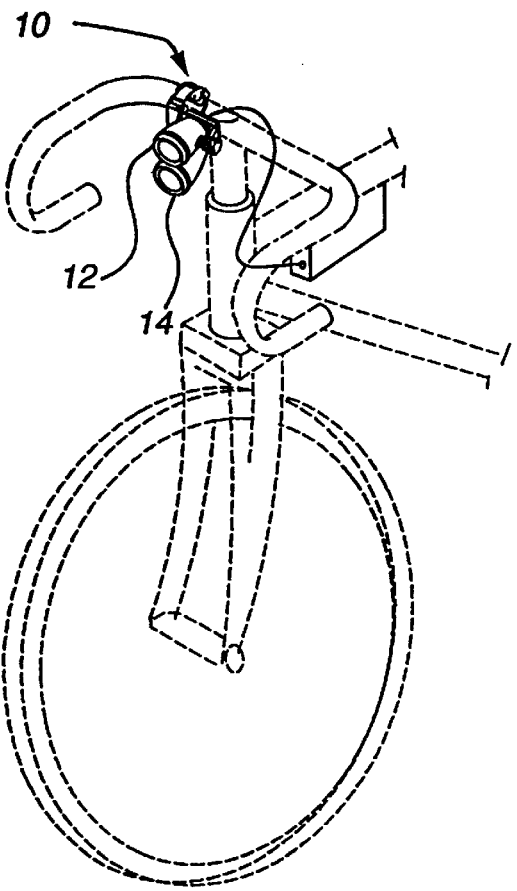
FIG. 1 is a perspective view of a bicycle in phantom with the bicycle lamp of the present invention in one orientation.
Figure 2:
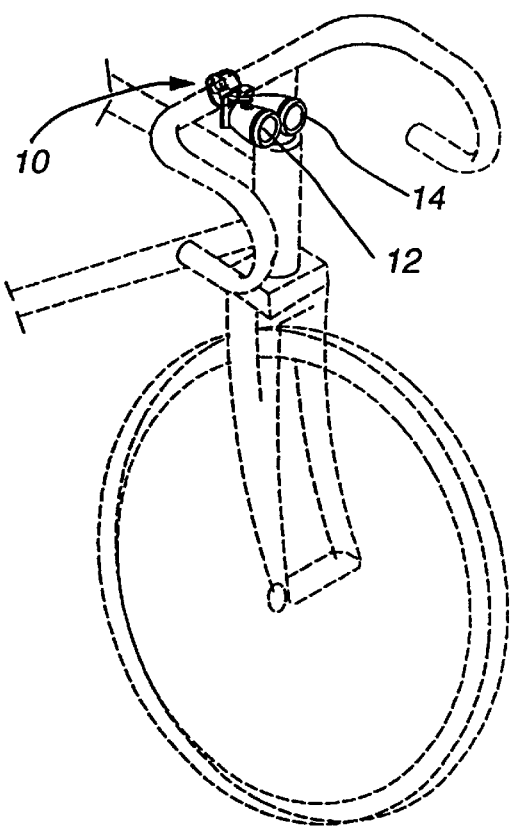
FIG. 2 is a perspective view of a bicycle in phantom with the bicycle lamp of the present invention in a different orientation than that shown in FIG. 1.

FIGS. 1 and 2 show a bike in phantom with the light assembly 10 of the present invention secured to the bike's handlebars. FIG. 1 illustrates the light assembly 10 in the vertical position, wherein lamps 12 and 14 are vertically positioned with respect to the handlebars. FIG. 2 illustrates the horizontal position wherein lamps 12 and 14 are horizontally positioned with respect to the handlebars. The present invention may be used with any bicycle wherein there is a mounting bar. The light assembly does not have to be mounted on the handlebars. The light assembly 10 may be mounted on any bar which receives the clamp assembly of the present invention. The bar does not need to be cylindrical, but may also be square shaped, or an elongated cylinder, with the only modification necessary being to the shape of the clamp assembly. Additionally, other structures such as baby strollers, baby joggers, and backpack frames, just to name a few, may utilize the lamp assembly 10 of the present invention.

The lamps 12 and 14 as generally shown in all the figures comprise a lens 22 and 24, lens mounting ring 18 and 20, and the lamp housing 28 and 30. The lens shown as 22 and 24 typically has some type of pattern to enhance the light transmission and angle of refraction of the lamps. Any lens material may be used, with the preferred lens material being tempered glass, commercially available from most bicycle dealers. The lamp housings 28 and 30 are made of nylon composite, but can be made of any material with the appropriate material characteristics. In reviewing the lamp's structure, FIG. 8 is particularly illustrative, in that a cross-section of the lamp assemblies is shown.

The lens mounting rings 18 and 20 may be secured on to the housing 28 and 30 through either a snap fit, a threaded mechanism, or any other means which would secure the lens mounting rings 18 and 20 to the lamp housings 28 and 30. In the preferred embodiment, shown in FIG. 8, a threaded securing means is shown. Thus, to remove the lens 22 and 24 from housings 28 and 30, lens mounting rings 18 and 20 would be rotated in a counter-clockwise fashion while maintaining lamp housings 28 and 30 in a fixed position.

Figure 8:
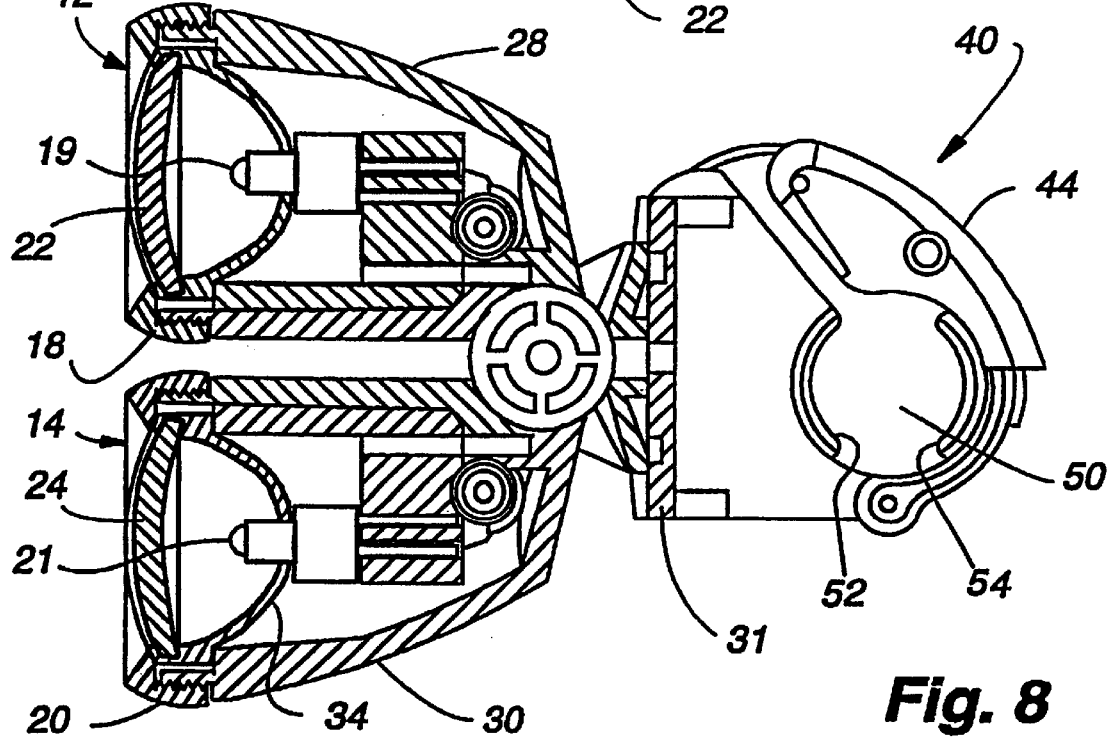
FIG. 8 is a cross-sectional view of the bicycle lamp of the present invention taken along lines 8 in FIG. 5.
Figure 9:
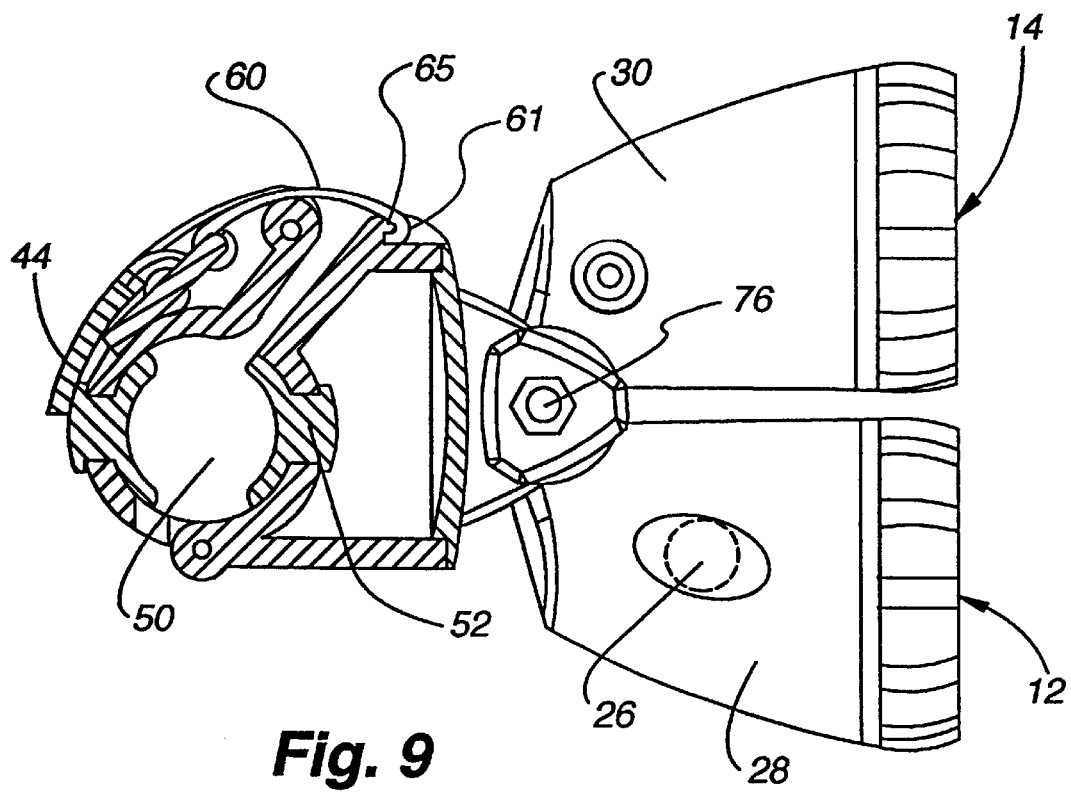
FIG. 9 is a cross-sectional view of the bicycle lamp of the present invention taken along lines 9 in Fix. 5
Figure 10:
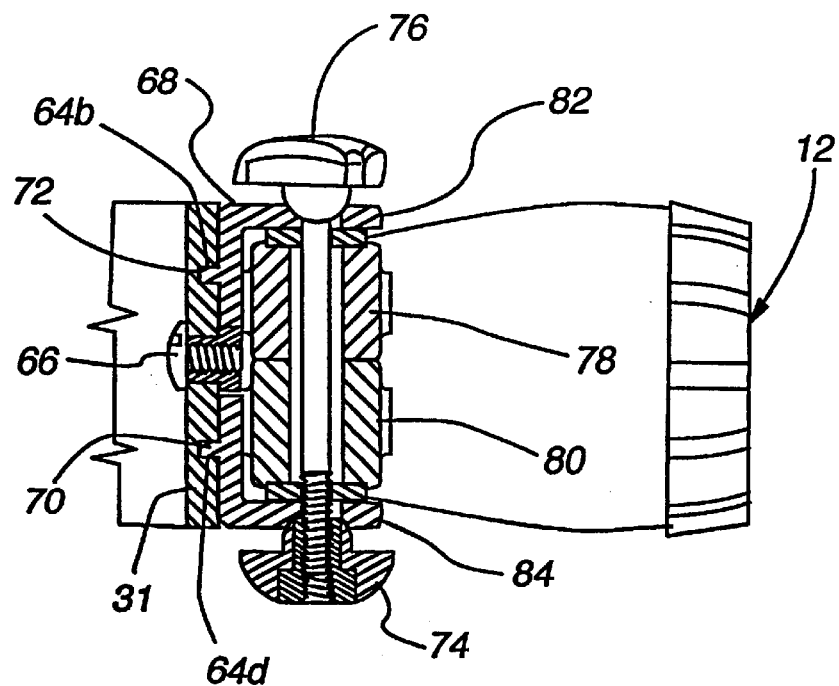
FIG. 10 is a cross-sectional view of the bicycle lamp of the present invention taken along lines 10 in FIG. 4.

Upon viewing FIG. 8, it is apparent that the lens housings 28 and 30 utilize removable mounting rings 18 and 20 such that light bulbs 19 and 21 may be accessed. These bulbs can be any type of bulb which would provide the requisite amount of light. Preferably, the bulb is a standard MR-11 size bulb. These lights bulbs will need to be replaced after they burn out. Also shown around light bulbs 19 and 21 are reflective surfaces 32 and 34. These reflective surfaces 32 and 34 insure that the light is reflected outwardly to provide a wide field of vision. In the preferred embodiment the bulbs and reflective surfaces are one piece.

Figure 4:
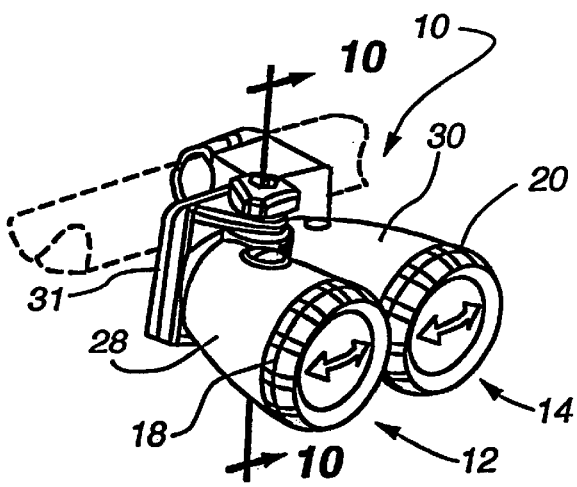
FIG. 4 is a close-up perspective view of the bicycle lamp of the present invention in its horizontal orientation.
Figure 5:
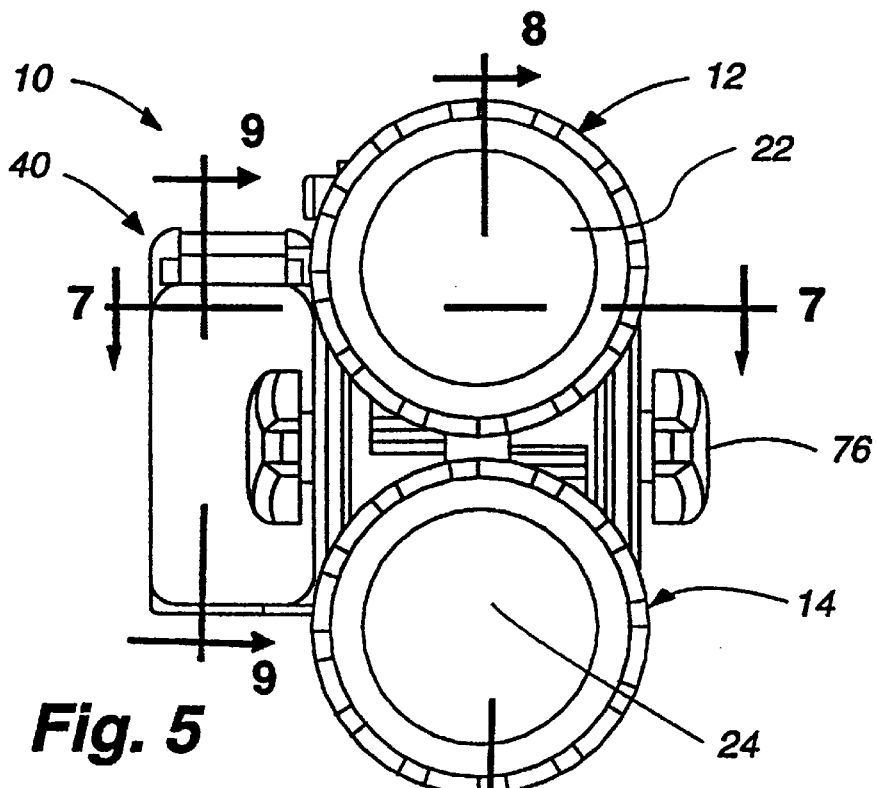
FIG. 5 is a front view of the bicycle lamp of the present invention in its vertical orientation.

FIG. 4 discloses the light assembly 10 in its horizontal position. As will be described in greater detail below, the actual lamp assembly is partially removable from the clamp assembly and may be repositioned on the clamp assembly to change the orientation of the lamps. FIGS. 6, 8, 11, and 18 illustrate the preferred embodiment of the handlebar clamp assembly 40 in detail. The clamp assembly 40 includes a substantially L-shaped main member 42 with an adjustable clamp mechanism 44 formed at the distal end 46 of main body member 42. Member 42 and clamp mechanism 44 act in cooperation through a pivot pin 48 which is positioned through a bore at distal end 46. Pivot pin 48 extends, through clamp 44 and bores in member 42, securing clamp 44 to member 42.

Figure 6:
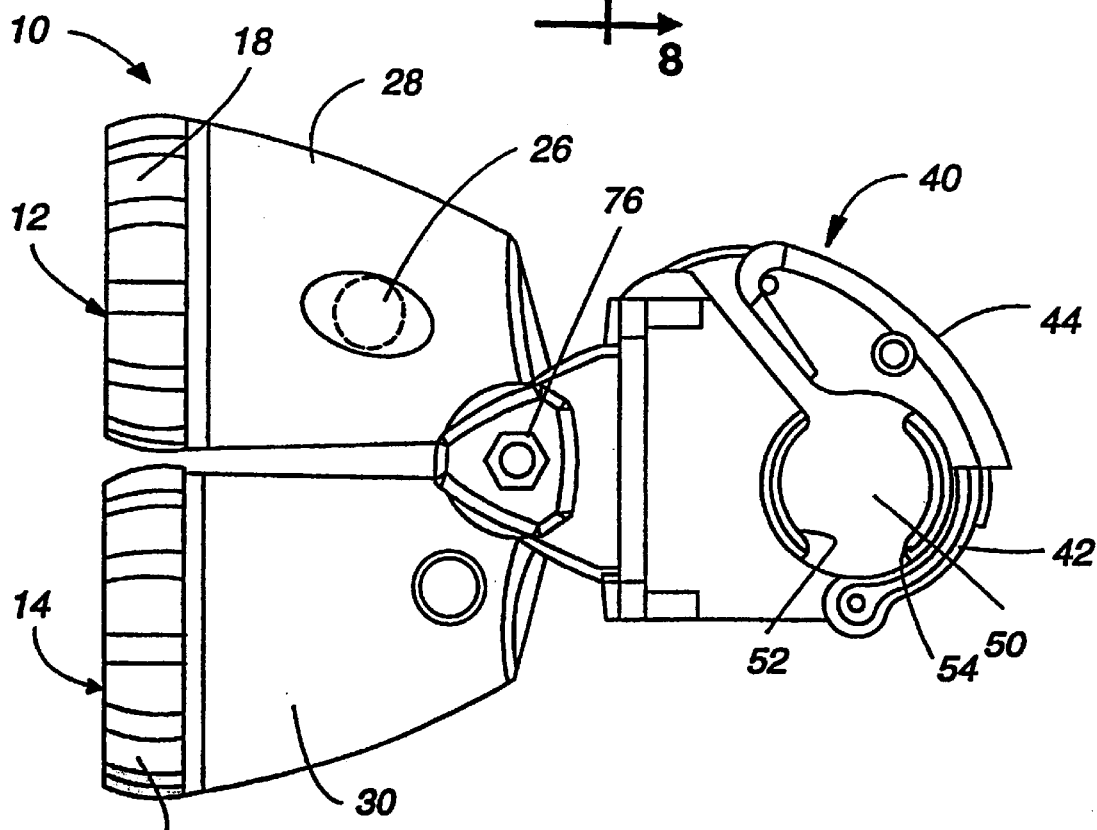
FIG. 6 is a side view of the bicycle lamp shown in FIG. 5.
Figure 7:
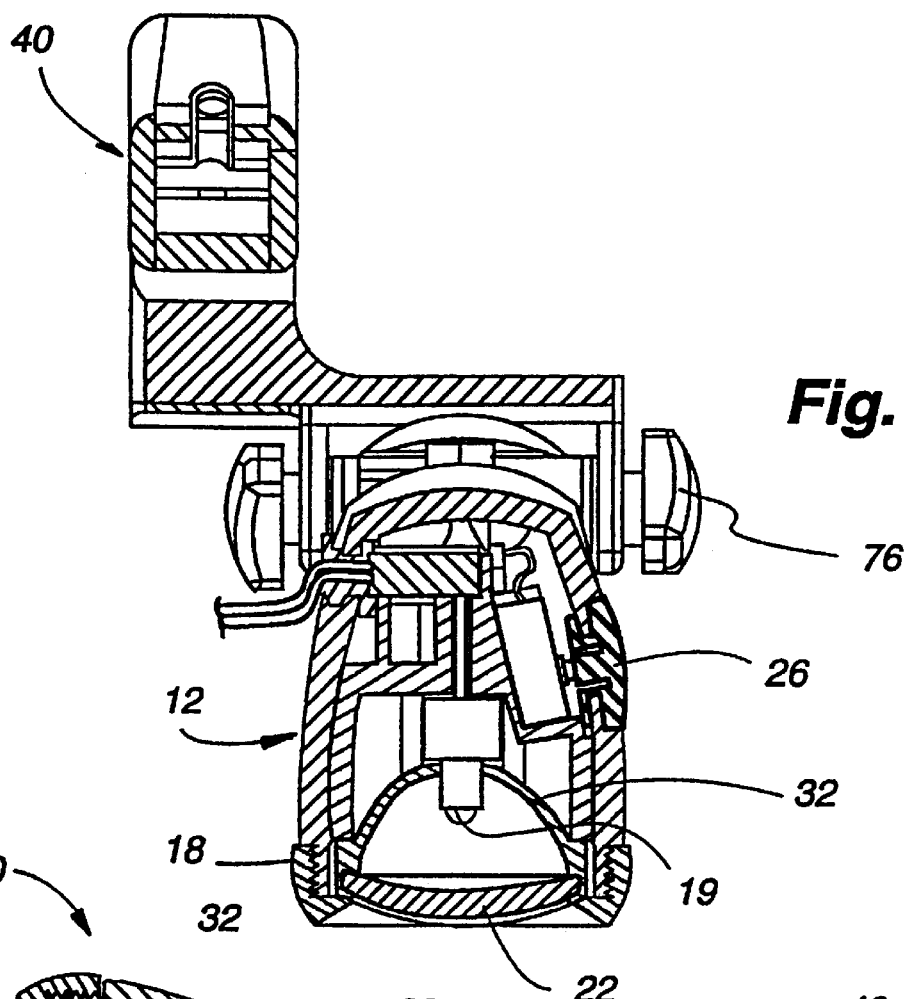
FIG. 7 is a cross-sectional view taken along lines 7 in FIG. 5.

Members 42 and clamp mechanism 44 are positioned such that there is an open position and a closed position. In the closed position, as shown in FIGS. 6 and 8, the clamp assembly 40 defines a annular space 50 to receive a bar. The space 50 is where a segment of the bicycle handlebar, or other bar to which the light will be attached, fits within. Pads 52 and 54 are also shown in the interspace 50. These pads 52 and 54 are preferably a rubber material which acts to resist scratching of the handlebars and also provides a tolerance for different size bars. In addition, the pads 52 and 54 help prevent the clamp assembly from slipping on the handle bar.

Figure 18:
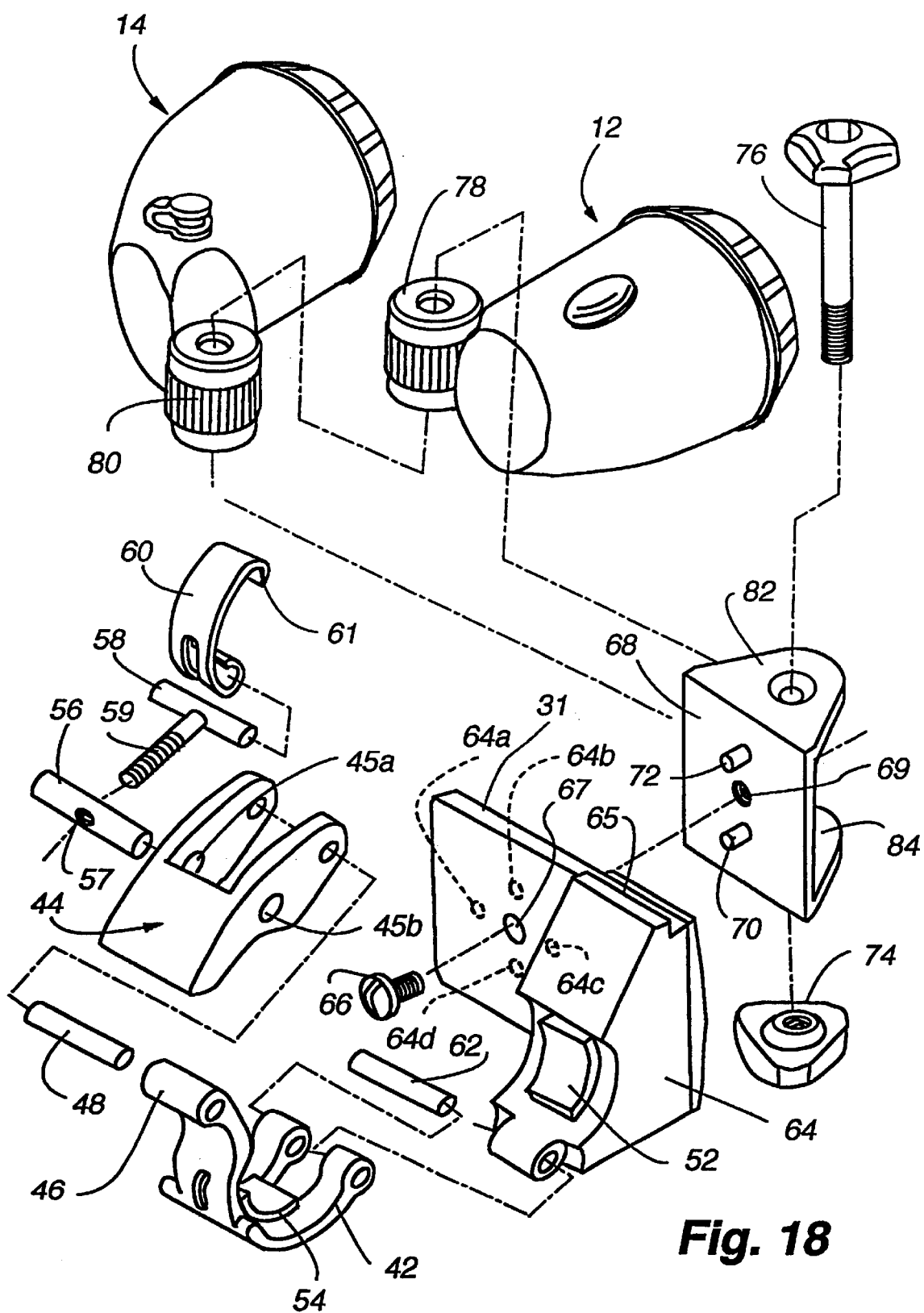
FIG. 18 is an exploded view of the bicycle lamp shown in FIGS. 1–11.

Referring to the exploded view in FIG. 18, the clamping assembly is shown in great detail. The clamping mechanism utilizes body members 42 and 44 interconnected with pins 62, 48 and 56 which all allow the clamping mechanism to clamp such that hook member 60 and lip 61 secures to engaging surface 65. This securing is achieved through a clamp mechanism which may be adjusted for different size bars. Pin 56 receives bale member 58 through an aperture 57 which is threaded to receive bale member 58. Bale member 58 extends through aperture 45a and 45b on member 44. These apertures are approximately mid-point along member 44. The bale member 58 has threads 59 which allow the length of the bale member to be adjusted such that hook member 60 and lip 61 may be secured to engaging surface 65 on member 64. The purpose of the different length threads 59 is so that bars having different circumferences may be accommodated by adjusting the length of bale member 58 vis-à-vis pin 56. Thus, the larger circumference of the bar which the lamp assembly of the present invention will be secured to, the further bale member 58 will be from pin 56. If the bar is very narrow, the bale member 58 will be shortened in pin 56 accordingly. The clamping mechanism diagrammed herein is the preferred mechanism, but any mechanism which is a quick release mechanism and allows a plurality of lights to be added could be used.

The lip 61 of member 60 releasably engages surface 65. When the clamping mechanism is moved to an open position, the lip 61 engages surface 65. Thereafter, when the clamping mechanism is closed, forming an "over-center" latch, the lip 61 is pulled securely against surface 65. Surface 65 can be any surface or latch, or receiving mechanism, which may receive a clamp member for securing a clamp to a bar.

The base member 64 has a first end or portion 29 and a second end or portion 31, the second portion 31 extending laterally from the first portion. The clamping assembly or member 40 is attached to the first end 29 of the base member 64, and removably secures the base member to the bar. The second end 31 of the base member 64 extends along and is spaced away from the bar. Portion 31 of base member 64 is secured to a lamp holding member 68. The two members are secured via some type of securing means, with the preference being a screw as shown as 66. The screw 66 is of sufficient length such that it passes through an aperture 67 formed in portion 31 into a threaded receiving means, such as aperture 69, on lamp holding member 68. These two members may be secured together through any type of means, including clamp means, hook and loop means, or any other type of securing means. What is critical is that lamp holding member 68 be capable of being released from member 64 such that the changing of the orientation on number of the lamps, being vertical, horizontal, or some other orientation, may be achieved. It is also desirable that the lamp holding member can hold one lamp as well as a plurality of lamps.

What is shown in the preferred embodiment in FIG. 18 is a set of guide pins 70 and 72 positioned such that they are received within apertures shown in phantom as 64a, 64b, 64c and 64d. When pins 70 and 72 are positioned such that they pass into 64b and 64d, the lamps are in a vertical position. If the user intends to rotate the lamps 90 degrees, screw 66 is at least partially removed from the aperture of lamp holding member 68, the pins 70 and 72 are pulled out of aperture 64b and 64d, and the assembly is rotated 90 degrees in either direction such that pins 70 and 72 correspond to 64a and 64c. Thereafter, screw 66 is re-tightened in the aperture in the member 68, into the threads on lamp holding member 68 and secured such that lamp holding member 68 is secured to member 64.

Additional apertures may be placed at angles other than 90 degrees on member 64. For example, apertures could be placed at a 45 degree angle such that the lamps would be half way between a vertical and horizontal position.

In other embodiments, the securing mechanism between members 64 and 68 could comprise some type of geared interface which may be secured by threaded fasteners. What is critical is that the lamp holding member 68 may be altered with respect to member 64 such that the lights or single light may be rotated.

Figure 3:
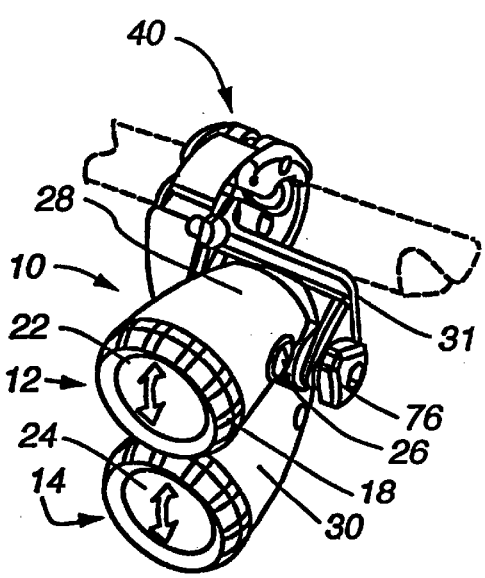
FIG. 3 is a close-up perspective view of the bicycle lamp of the present invention in its vertical orientation.

The lamps themselves may be rotated with respect to the lamp holding member 68. Each lamp has a cylindrical boss attached in an off-set manner at the base opposite the lens. These are shown as 78 and 80 respectively. Referring to lamp 12 and boss 78, the lamp is substantially conical in shape and receives a cylindrical boss 78 attached in an off-set manner at the base opposite the lens. The boss 78 defines an axial bore extending through the boss, and serrations formed to extend longitudinally about its outer surface. The boss 78 is placed adjacent one of the flanges through which screw 76 extends. In FIG. 18, the lights are stacked in a vertical manner, such that light 12 is on the top and light 14 is on the bottom with screw 76 extending through boss 78 and 80 and being secured to the lamp holder 68 by nut 74. Lamp holder 68 could be bigger to accommodate more lamps, or the lamps could be smaller. The inner surface of lamp holding member 68 is shown in FIG. 14. The counter-serrations in FIG. 14 are spaced such that serrations on bosses 78 and 80 engage within the serrations on lamp holding member 68. A rotation of the individual lamps 12 and 14 about the lamp holding member 68 is controlled by the serrations formed on the outside of the bosses 78 and 80 which engage complementary serrations formed on the inner surface of the lamp holding member 68 independently in different directions as shown by the arrow in FIGS. 3 and 4. The lamps may be close together as shown in FIGS. 3 and 4, or they may be spread out at 90 degree angles or greater, depending on the geometry of the lamps and depending on what is required by the user.

Figure 15:
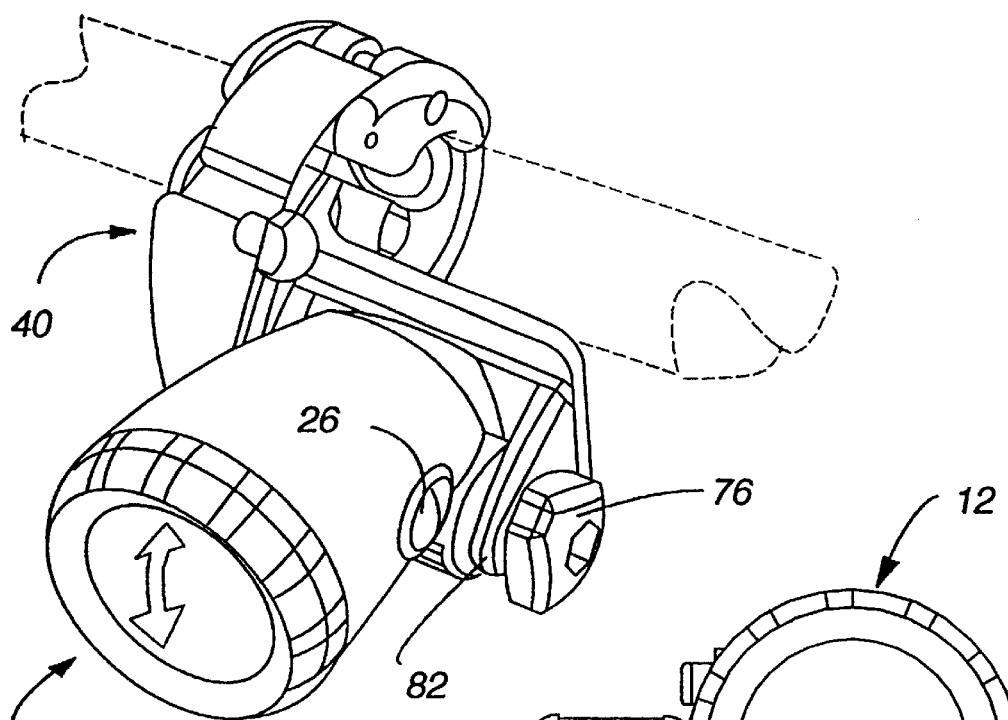
FIG. 15 is a perspective view of the bicycle lamp of the present invention wherein one of the lights is removed.
Figure 16:
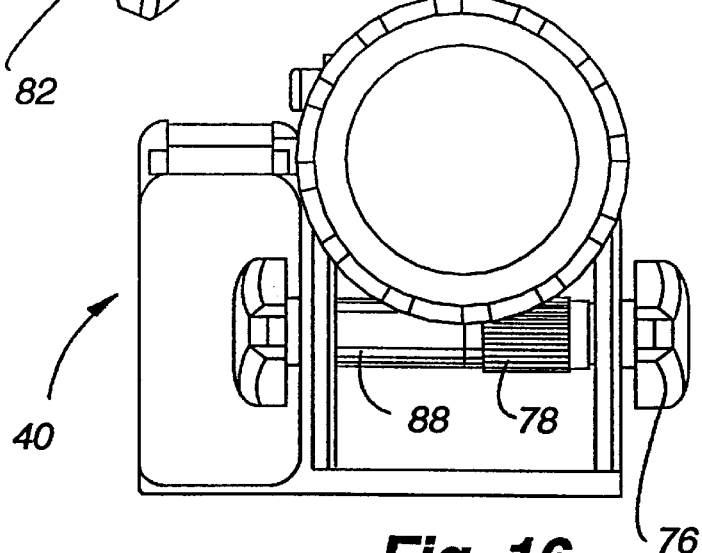
FIG. 16 is a front end view of the light shown in FIG. 15.
Figure 17:
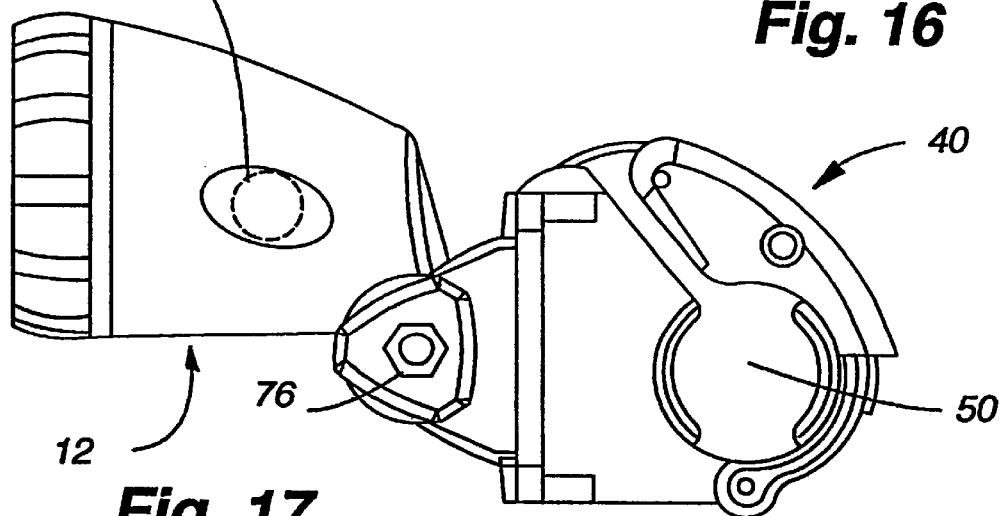
FIG. 17 is a side view of the light shown in FIG. 15.

In some situations, the user may only want to have one light, as shown in FIGS. 15–17. In this situation, a spacer is used in place of one of the bosses. As is evident in FIG. 16, spacer 88 replaces one of the bosses. This allows a single light to be used. This feature is an extremely important aspect of the present invention. It is advantageous to be able to sell the clamping mechanism with just one light, for cost purposes. The present invention provides the purchaser an opportunity to thereafter acquire a second, single light, and add it to the first purchased light.

The present invention is not limited to a one or two light configuration, but as many lights as necessary may be stacked between flanges 82 and 84, obviously increasing the space between the flanges. Alternatively, the dimensions of the light may be changed, such that the flanges may be the same distance apart but that the lights are only half as big such that four lights may fit within the space.

Each lamp has an "on" and "off" button 26, and in the preferred embodiment a power pack is located elsewhere on the bicycle, which through an electrical connection, provides electricity to the lamps. The preferred battery pack is a 6-volt nicad rechargeable battery pack. Other non-limiting options include lead-acid batteries and 12-volt nicad battery packs.

It is understood that while the invention has been described above in conjunction with preferred specific embodiments, the description and examples are intended to illustrate not limit the scope of the invention, which is defined by the scope of the appended claims:

What is claimed is:

1. A light assembly mountable on a bar of a bicycle, said light assembly comprising:

a base member;

a lamp holding member connected with the base member;

at least two lamps connected with the lamp holding member;

a clamp assembly including at least one body member pivotally connected with the base member; and wherein the base member and the body member move between an open position and a closed position.

2. The light assembly of claim 1, the at least one body member including a first body member pivotally connected with a second body member.

3. A light assembly mountable on a bar of a bicycle, said light assembly comprising:

a base member;

a lamp holding member connected with the base member;

at least one lamp connected with the lamp base member;

a clamp assembly including at least one body member pivotally connected with the base member;

the at least one body member comprises including a first body member pivotally connected to a second body member;

the clamp assembly including a hook pivotally connected to the second body member; and wherein the base member and the body member move between an open position and a closed position.

4. The light assembly of claim 3, the base member defining an engaging surface, wherein the hook is adapted to engage the engaging surface in the closed position.

5. The light assembly of claim 3, the clamp assembly further including a bail member adjustably connecting the hook to the second body member.

6. The light assembly of claim 1, wherein the clamp assembly defines an overcenter clamp.

7. The light assembly of claim 1, wherein the clamp assembly defines means for clamping the lamp mounting member to the bar.

8. The light assembly of claim 1, the at least one lamp being pivotally connected with the lamp holding member.

9. The light assembly of claim 1, the at least one lamp including a first lamp and a second lamp.

10. The light assembly of claim 9, the first lamp being in a generally horizontal alignment with the second lamp.

11. The light assembly of claims 9, the first lamp being in a generally vertical alignment with the second lamp.

12. The light assembly of claim 1, wherein the clamp assembly and base member define an annular space in the closed position.

13. The light assembly of claim 12, wherein the annular space is adapted to receive the bar and thereby secure the light assembly to the bar.

14. The light assembly of claim 1, the lamp holding member defining means for releasably connecting the at least one lamp with the base member.

15. A light assembly mountable on a bar of a bicycle, said light assembly comprising:

a base member;

a holding member connected with the base member;

means for providing light connected with the holding member;

the means for providing light including a means for arranging the means for providing light to project at least one of a horizontal light beam, a vertical light beam, and a diagonal light beam; and wherein the base member and the body member move between an open position and a closed position.

16. The light assembly of claim 15, wherein the means for providing light comprises at least two lamps.

17. The light assembly of claim 15, wherein the means for arranging includes a clamp assembly pivotally connected to the base member.

18. The light assembly of claim 17, wherein the clamp assembly comprises at least one body member, wherein the at least one body ember of the claim assembly is pivotally connected to the base member.

19. The light assembly of claim 18, wherein the at least one body member comprises a first body member and a second body member, the second body member is pivotally connected to a hook.

20. The light assembly of claim 16, wherein the means for arranging allows the at least two lamps to be in at least one of generally horizontal alignment; generally vertical alignment; and generally diagonal alignment.

* * * * *